(12) United States Patent
Mikami (10) Patent No.: US 8,699,122 B2
(45) Date of Patent: Apr. 15, 2014

(54) INTERFEROMETER, DEMODULATOR, AND OPTICAL FIBER COMMUNICATION MODULE

(75) Inventor: Hideharu Mikami, Kawasaki (JP)

(73) Assignee: Oclaro Japan, Inc., Kanagawa (JP)

( * ) Notice: Subject to any disclaimer, the term of this patent is extended or adjusted under 35 U.S.C. 154(b) by 272 days.

(21) Appl. No.: 12/826,763

(22) Filed: Jun. 30, 2010

(65) Prior Publication Data

US 2010/0329667 A1  Dec. 30, 2010

(30) Foreign Application Priority Data

Jun. 30, 2009  (JP) ................................. 2009-154543

(51) Int. Cl.
*G01B 9/02* (2006.01)
*G02F 2/00* (2006.01)

(52) U.S. Cl.
USPC ............................ 359/325; 359/578; 356/491

(58) Field of Classification Search
USPC .......... 359/325, 249, 577, 578; 356/249, 450, 356/491, 577, 578
See application file for complete search history.

(56) References Cited

U.S. PATENT DOCUMENTS

| | | | |
|---|---|---|---|
| 5,528,369 A * | 6/1996 | Starkey | 356/491 |
| 5,684,630 A | 11/1997 | Arai | |
| 6,249,350 B1 * | 6/2001 | Dultz et al. | 356/491 |
| 6,366,390 B1 | 4/2002 | King et al. | |
| 6,765,679 B2 * | 7/2004 | Ducellier et al. | 356/491 |
| 6,834,146 B2 | 12/2004 | Rockwell et al. | |
| 7,526,210 B2 * | 4/2009 | Liu | 398/188 |
| 7,847,952 B2 * | 12/2010 | Suzuki et al. | 356/491 |
| 8,264,764 B1 * | 9/2012 | Hsieh | 359/325 |
| 8,270,067 B1 * | 9/2012 | Hsieh et al. | 359/325 |
| 8,315,489 B2 * | 11/2012 | Prucnal et al. | 385/17 |
| 2006/0056845 A1 * | 3/2006 | Parsons et al. | 398/41 |
| 2006/0122050 A1 | 6/2006 | Borrelli et al. | |
| 2007/0047081 A1 * | 3/2007 | Hodgson et al. | 359/499 |
| 2008/0218836 A1 | 9/2008 | Suzuki et al. | |
| 2009/0027683 A1 | 1/2009 | Suzuki et al. | |
| 2010/0221002 A1 | 9/2010 | Ooi et al. | |

FOREIGN PATENT DOCUMENTS

| | | |
|---|---|---|
| JP | 05-079815 | 3/1993 |
| JP | 05-240602 | 9/1993 |
| JP | H07-253511 | 10/1995 |
| JP | 09-146020 | 6/1997 |
| JP | 09-250902 | 9/1997 |
| JP | 2006-169098 | 6/2006 |
| JP | 2008-224313 | 9/2008 |
| JP | 2008-241950 | 10/2008 |
| JP | 2010-224346 | 10/2010 |
| WO | WO 2009/031196 | 3/2009 |

OTHER PUBLICATIONS

Office Action in JP 2009-154543, mailed Nov. 12, 2013 (in Japanese, 4 pgs.); [English language translation, 6 pages].

* cited by examiner

*Primary Examiner* — Daniel Petkovsek (74) *Attorney, Agent, or Firm* — Antonelli, Terry, Stout & Kraus, LLP.

(57) ABSTRACT

In a delay line interferometer inside a demodulator, with respect to polarization states of two split beams of light to be interfered with each other, p polarization and s polarization are reversed by a half beam splitter and, further, again multiplexed by the half beam splitter used for splitting so that interference beams of light are generated.

1 Claim, 9 Drawing Sheets

INTERFEROMETER, DEMODULATOR, AND OPTICAL FIBER COMMUNICATION MODULE

CLAIM OF PRIORITY

The present application claims priority from Japanese patent application JP 2009-154543 filed on Jun. 30, 2009, the content of which is hereby incorporated by reference into this application.

FIELD OF THE INVENTION

The present invention relates to an optical interferometer, a demodulator which demodulates differential phase shift keying signals in an optical communications system, and an optical fiber communication device (module) using the same.

BACKGROUND OF THE INVENTION

In the field of optical communications, there has been used for a long time the simplest system in which intensity modulation is performed as signal modulation and, as demodulation, light intensity is directly converted to an electric signal using an optical detector. However, in recent years, in order to comply with the high bit rate exceeding 40 Gbps, the system in which phase modulation is performed as signal modulation has been attracting attention. There are two methods for demodulating a phase modulation signal. One is a method (coherent optical fiber communication) in which signal-modulated and transmitted light is demodulated by allowing it to interfere with light from a local oscillator provided on the receiver side. The other is a method (differential phase shift keying system) in which a signal-modulated light is split into two. Then, they are multiplexed by shifting the timing by one bit of signal of signal modulation to interfere with each other, and then the shift of the phase is converted to the light intensity signal to be demodulated. Of these two methods, being different from the case of the coherent optical fiber communication, in the differential phase shift keying system, a frequency of the signal light and a frequency of the local oscillator do not have to be synchronized. Since it is comparatively easy to implement the differential phase shift keying system, it has been attracting attention as a system which is nearing practical use. Depending on the number of phases to be modulated, this system is called either a differential binary phase shift keying (DBPSK or DPSK) or a differential quadrature phase shift keying (DQPSK).

Figure 1:
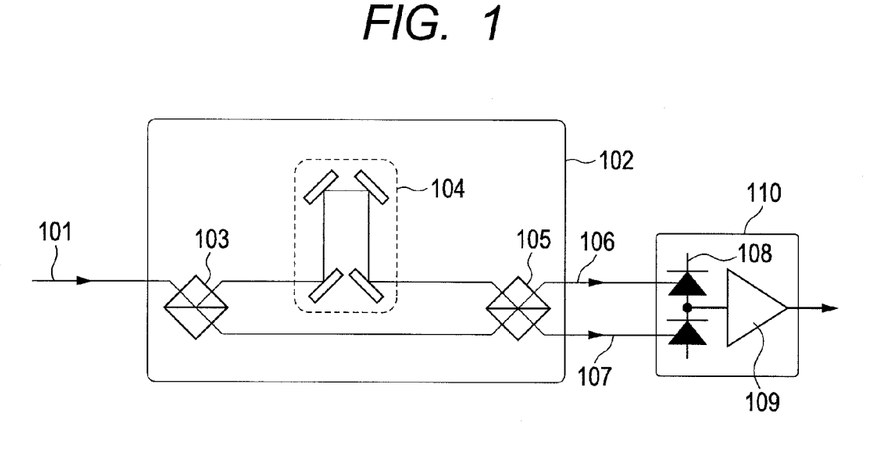
FIG. 1 is a schematic diagram of a demodulator for DPSK.

With reference to FIG. 1, the modulation method in differential phase shift keying will be explained. Light 101 on which differential phase shift keying is applied enters a delay line interferometer 102. Then, the modulated light 101 is split into two by a light splitting component such as a half beam splitter 103. One of the split beams of light is given an optical path length of one bit (about 7.5 mm, for example, when the signal modulation frequency is 40 GHz) with respect to the other split beam of light by a delaying unit 104 comprising mirrors and is set so that the optical path length difference of the split beams of light becomes a value made by multiplying a wavelength of the light by an integer (that is, the phase difference is zero). Then, the two split beams of light are again multiplexed by the half beam splitter 105, and two interference beams of light 106 and 107 are generated. In this regard, as focusing on the interference light 106, the interference is constructive when the phase shift amount between the adjacent bits is 0 and the interference is destructive when the amount of phase shift is $\pi$. As a result, the interference light 106 is converted to the one with intensity of the interference light corresponding to the amount of phase shift between the adjacent bits. The interference light 107 is in a state where its phase differs from that of the interference light 106 by $\pi$. Therefore, it is destructive when the interference light 106 is constructive and it is constructive when the interference light 107 is destructive, resulting in the output whose intensity of light is reversed. By detecting the intensity difference of these beams of interference light with use of a balanced optical detector 108 and a differential detector 110 comprising a trans-impedance amplifier 109, a demodulated signal is obtained.

Figure 2:
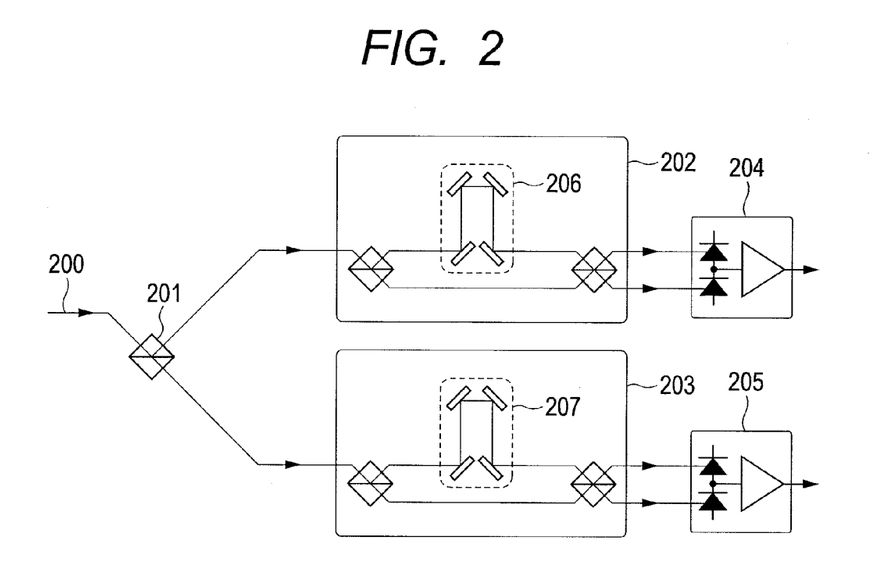
FIG. 2 is a schematic diagram of a demodulator for DQPSK.

As shown in FIG. 2, demodulation in DQPSK is performed by using two delay line interferometers similar to the ones used in demodulation of differential phase shift keying. To be specific, a modulated beam of light 200 on which differential phase shift keying is applied is split into two by a half beam splitter 201. Then, the split beams of light are led to respective delay line interferometers 202 and 203. Further, interference beams of light generated in the respective delay line interferometers are detected by differential detectors 204 and 205. With respect to the delay line interferometer 202, a delaying unit 206 is set so that the optical path length difference of the two split beams of light becomes a value made by multiplying the wavelength by an integer. However, in the case of the delay line interferometer 203, a delaying unit 207 is set so that the optical path lengths of the two split beams of light differ from each other by $(n+\frac{1}{4})\lambda$ (where n is an integer and $\lambda$ is a wavelength of light). In this regard, when the amount of phase shift between adjacent bits is 0 or $\pi$, there occurs constructive interference or destructive interference in the delay line interferometer 202. On the other hand, in the case of $\pi/2$ or $3\pi/2$, there occurs constructive interference or destructive interference in the delay line interferometer 203. Therefore, it becomes possible to demodulate a DQPSK-modulated signal from the output of the differential detectors 204 and 205. Furthermore, it is possible to demodulate a differential phase shift keying signal of a given M value with use of the same configuration.

For implementing the above delay line interferometer, there are two embodiments possible. One is an embodiment in which a light waveguide is mainly used. The other is an embodiment in which a free space optical system with use of a bulk optical component is used. While mass production is easy in the former case, it also has demerits such as requiring temperature control, consuming a lot of electric power, and being large in size. On the other hand, in the latter case, power consumption can be kept low, being compactly structured. Thus, it is attracting attention as a promising mode of implementation.

Generally, in regard to the modulated light in the optical communications, when arriving at the demodulator, polarization is disturbed by anisotropy of the material of the optical fiber through which the light has passed, and is in a random polarization state. For this reason, the characteristic of the modulator needs to be independent of the polarization of the demodulated light. PDFS (Polarization Dependent Frequency Shift) is a phenomenon in which modulated light is demodulated according to the polarization state, as if it has a different frequency (wavelength), causing degradation of the signal quality. Therefore, when implementing the demodulator, reduction of PDFS is a problem to be addressed.

PDFS is caused when an optical path length difference between the two split beams of light (or a phase difference) has polarization dependence in the delay line interferometer inside the demodulator. Above all, in the free space optical system, a main factor responsible for the above polarization dependence is the imperfection of the half beam splitter to be used for splitting and multiplexing beams of light. To be exact, it is a principal factor that p polarized light and s polarized light to the light splitting surface of the half beam splitter undergo different phase changes when passing through and being reflected on the surface.

JP-A-2008-224313 (corresponding to official gazette No. US2008/0218836) is intended to solve the problem of PDFS by disposing, on the optical path of the split light, a phase compensation component for offsetting the above phase shift. In this case, relative phases of the p polarization and s polarization are varied according to the above phase compensation component, which negates the relative phase difference occurring in the half beam splitter and eliminates the polarization dependency.

Also, JP-A-2008-241950 (corresponding to official gazette No. US2009/0027683) is intended to solve the problem of PDFS by splitting and multiplexing beams of light with use of the same half beam splitter and, further, by arranging positions of the two half beam splitter surfaces to be reversed with respect to the split light. In this case, relative phases of reversed orientation are generated when splitting and multiplexing beams of light and, by cancelling both of them, the polarization dependence is eliminated.

SUMMARY OF THE INVENTION

In the method according to JP-A-2008-224313, the relative phase difference between the p polarization and the s polarization to be generated by the phase compensation component is basically determined by the magnitude of the relative phase difference generated in the half beam splitter. Therefore, in order to precisely suppress PDFS, it is necessary to adjust, when assembling a delay line interferometer, the relative phase difference in the phase compensation component while monitoring interference light. Alternatively, regarding the relative phase difference to be generated in the half beam splitter as already known, it is necessary to prepare a phase compensation component so that the relative phase difference may be a certain fixed quantity. However, according to the former method, assembly adjustment of the delay line interferometer becomes complicated. Moreover, in the latter method, it is necessary to design the phase compensation component based on the relative phase difference occurring in the half beam splitter, complicating the design. Furthermore, the latter method cannot cope with a case where the relative phase difference varies due to variations etc. in characteristics of the half beam splitters. Still further, according to the method of JP-A-2008-241950, it is necessary to prepare beam splitters individually for splitting light and multiplexing light or to prepare a specially configured beam splitter. Therefore, the optical system becomes complicated.

In view of the above problems, it is an object of the present invention to provide an interferometer which has no polarization dependence, which is simply structured, and whose adjustment is easy. Further, it is another object of the present invention to provide a demodulator, equipped with such a delay line interferometer for differential phase shift keying signals and an optical fiber communication module using the same.

In order to achieve the objects of the present invention, following measures are employed.

Light splitting components such as a half beam splitter splits light to be measured into first split light and second split light. Reflection components such as mirrors reflect the first split light and the second split light. A p polarization element and an s polarization element are reversed by a polarization rotation component such as a quarter wave plate. Then, the split light is allowed to enter the light splitting component such as the half beam splitter again to be multiplexed, thereby first interference light and second interference light are generated.

With the above structure, the p polarization and the s polarization are reversed by the quarter wave plates disposed on optical paths of the first split light and the second split light, respectively, so that PDFS occurring in the half beam splitter is eliminated. According to the present structure, PDFS is eliminated regardless of the relative phase difference between the p polarization and the s polarization occurring in the half beam splitter. Therefore, designing and adjustment of assembly of the optical system is easy. Moreover, PDFS is stably eliminated regardless of variation in characteristics of the half beam splitters to be employed.

As the above quarter wave plate, a zero-order quarter wave plate was used. As a result, the same effect can be obtained with respect to a wideband wavelength, being able to comply with a wavelength division multiplexing (WDM) method.

As for the quarter wave plates acting on the first interference light and the second interference light, the ones of substantially the same thickness were used. When the present structure is applied to demodulation of the different phase shift keying, the optical path length difference between the first split light and the second split light must be set to a fixed value corresponding to a modulation frequency. However, with the present structure, these quarter wave plates can be used without varying the above optical path length difference, making the design and assembly adjustment of the optical system easy. In addition, the "substantial same thickness" includes a thickness having some errors such as a manufacture error of the quarter wave plate.

According to another structure, with respect to each of the first split light and the second split light, their directions of the optical axes at the time when the beams of light is split by the light splitting component and at the time when the beams of light are multiplexed are substantially in antiparallel to each other. Thus, it is possible to allow the light to enter with the same incident angle both at the time of splitting the light to be measured and at the time of multiplexing the light to be measured. Therefore, even when the phase change occurring in the half beam splitter is dependent on the incident angle, PDFS can be eliminated stably. In addition, the case of being substantially antiparallel includes a case where complete antiparallel relation is not realized due to manufacturing errors etc. of elements (for example, mirrors) for achieving antiparallel.

According to another structure, in place of the quarter wave plate, a mirror group comprising three mirrors is used for the reflection component. As a result, when the split light is reflected, s polarization and p polarization can be simultaneously reversed, allowing the structure of the optical system to be simple. Moreover, the wavelength dependence is extremely low. Therefore, the same effect can be obtained with respect to a wideband wavelength, being able to comply with the WDM system.

Moreover, with respect to the demodulator, the demodulated light on which the differential phase shift keying is applied is split into one beam or plural beams by a light splitting component such as a half beam splitter. Then, each beam of light is split into first split light and second split light by the half beam splitter. Further, each of the first split light and the second split light is reflected by a reflection component such as a mirror. Still further, a p polarization element and an s polarization element are reversed by a polarization rotation component such as a quarter wave plate. With the delay of one bit of signal modulation, the light enters again the light splitting component such as the half beam splitter and multiplexed to be first interference light and second interference light. These beams of light are received by a differential detector so as to output an electric signal corresponding to an intensity difference between the first interference light and the second interference light.

With the above structure, PDFS can be eliminated effectively and stable demodulated signals can be obtained regardless of the polarization state of the light to be measured. According to the present structure, PDFS can be eliminated regardless of the relative phase difference between p polarization and s polarization generated in the half beam splitter, allowing assembly adjustment of the optical system in the demodulator to be easy. Moreover, PDFS can be eliminated stably regardless of variation in characteristics of the half beam splitters to be used.

According to an aspect of the present invention, it is possible to provide a demodulator for the differential phase shift keying signal and an optical fiber communication module which are easier to design and adjust compared to conventional arts, whose structure is simple, and whose variation among individual components dependent of polarization is reduced.

BRIEF DESCRIPTION OF THE DRAWINGS

The invention will be more particularly described with reference to the accompanying drawings, in which.

DETAILED DESCRIPTION OF THE PREFERRED EMBODIMENTS

First Embodiment

Now, with reference to FIG. 3, an embodiment of the present invention will be described.

Figure 3:
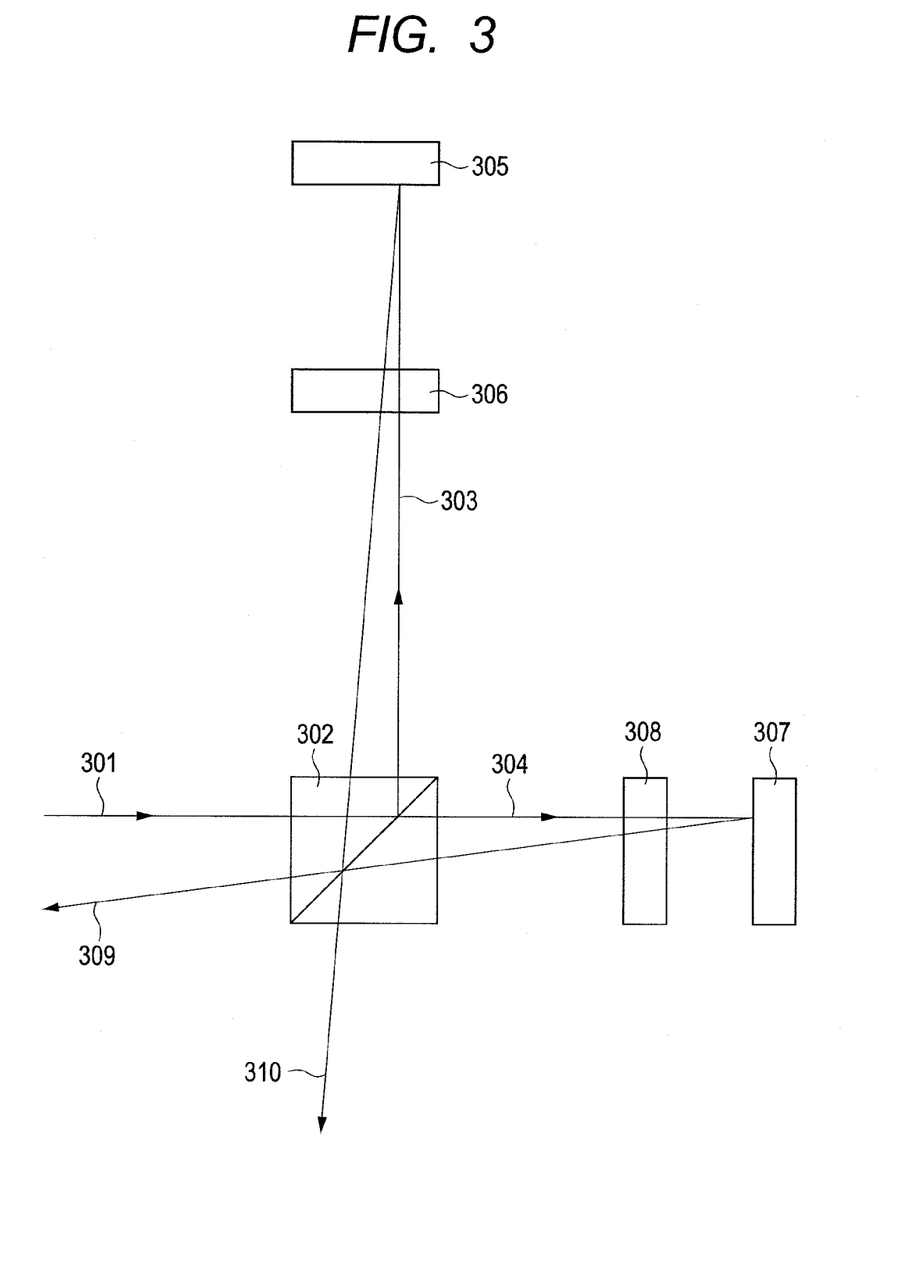
FIG. 3 shows an example of an optical system which realizes an interferometer of the present invention.

FIG. 3 shows a fundamental embodiment of the present invention. A DSPK-modulated light 301 enters a half beam splitter 302 and is split into first split light 303 and second split light 304 with an intensity ratio of 1:1. The first split light 303 enters a mirror 305 at an angle of almost 90 degrees. The light reflected on the mirror 305 enters the beam splitter 302 again. In this regard, a quarter wave plate 306 is disposed on an optical path along which the first split light does a round trip, and its fast axis direction makes an angle of 45 degrees with respect to p polarization defined by a split surface of the half beam splitter 302. As a result, of the polarization elements of the first split light 303, a p polarization element is converted to an s polarization element when it enters the half beam splitter 302 again. In the same manner, an s polarization element is converted to a p polarization element. Similarly, the second split light 304 enters a mirror 307 at an angle of almost 90 degrees. The light reflected on the mirror 307 enters the beam splitter 302 again. The quarter wave plate 308 is disposed on both the outbound optical path and the inbound optical path (with the fast axis direction being inclined at an angle of 45 degrees with respect to p polarization). Therefore, the p polarization element and the s polarization element are reversed. When entering the half beam splitter 302 again, the first split light 303 and the second split light 304 are multiplexed, and first interference light 309 and second interference light 310 are generated. In this regard, the mirrors 305 and 307 are arranged such that a difference between the optical path length of the first split light 303 and the optical path length of the second split light 304 corresponds to one bit of the signal modulation of the modulated light. For example, when the modulation frequency is 40 Gbps, a difference between the optical path lengths is about 7.5 mm. Therefore, when the amount of phase shift between the adjacent bits of the light to be measured is 0 or π, each of the first interference light 309 and the second interference light 310 turns to be in a constructive state or in a destructive interference state. As a result, the differential phase shift keying signal is converted to a light intensity signal.

In this regard, with respect to the first split light 303 and the second split light 304, when they are split or multiplexed by the half beam splitter 302, their respective p polarization element and s polarization element come to have a relative phase difference therebetween. This means that the split beams of light have respective different optical path lengths according to polarization elements. However, according to the present embodiment, the two split beams of light go and come back through the quarter wave plate to reverse the p polarization element and s polarization element. Therefore, there is an offset relationship between a relative phase difference generated when light to be measured is split and a relative phase difference generated when the split light is multiplexed. As a result, an interference state not depending on a polarization state can be acquired.

Now, functions of the quarter wave plates 306 and 308 will be described in detail. Generally, given that electric fields of light incident from two input ports of the beam splitter are E1 and E2, they are shown as follows.

$$\begin{pmatrix} E_1 \\ E_2 \end{pmatrix}$$ [Expression 1]

When E1 and E2 are shown by vector as above, two electric fields of light generated after having passed through the beam splitter are shown by the following vector.

$$\begin{pmatrix} ie^{i\phi}\sqrt{R} & \sqrt{T} \\ \sqrt{T} & ie^{-i\phi}\sqrt{R} \end{pmatrix} \begin{pmatrix} E_1 \\ E_2 \end{pmatrix}$$ [Expression 2]

In Expression 2, a 2×2 matrix shows an operation of the beam splitter. R and T correspond to an absolute value of the intensity reflectance and an absolute value of the intensity transmittance of the beam splitter, respectively. Also, φ corresponds to a phase difference occurring between light passing through and light being reflected, respectively. The fact that φ of p polarization differs from φ of s polarization causes PDFS. Therefore, values of φ corresponding to p polarization and s polarization are referred to as "φp" and "φs," respectively. Moreover, it is assumed that the light to be measured is of p polarization.

$$\begin{pmatrix} ie^{i\phi}\sqrt{R} & \sqrt{T} \\ \sqrt{T} & ie^{-i\phi}\sqrt{R} \end{pmatrix} \begin{pmatrix} E_1 \\ E_2 \end{pmatrix} \quad \text{[Expression 2]}$$

In Expression 2, when the light to be measured is split by the half beam splitter 302, E2=0. Further, supposing that there is no loss in the half beam splitter and the light is split at the rate of 1:1, T=R=½. Therefore, the electric field of the light after split is expressed as follows.

$$\frac{1}{\sqrt{2}}\begin{pmatrix} ie^{i\phi_p} & 1 \\ 1 & ie^{-i\phi_p} \end{pmatrix}\begin{pmatrix} E_1 \\ 0 \end{pmatrix} \quad \text{[Expression 3]}$$

In Expression 3, a first component of the vector shows reflected light (namely, the first split light 303 in the embodiment). Also, a second component shows light that passes through (namely, the second split light 304 in the embodiment). In this regard, when optical path lengths reaching points at which the light being reflected and the light passing through are multiplexed again by the same half beam splitter are designated as l1 and l2, respectively, a process from splitting of the light to multiplexing of the light are expressed by a following determinant.

$$\begin{pmatrix} \exp[2\pi i l_1/\lambda] & 0 \\ 0 & \exp[2\pi i l_2/\lambda] \end{pmatrix} \quad \text{[Expression 4]}$$

Moreover, the two split beams of light pass through the quarter wave plate, in a reciprocating manner, whose fast axis direction is inclined at an angle of 45 degrees with respect to p polarization. As a result, the p polarization is converted to s polarization. Therefore, a process in which the split light is multiplexed is shown as follows.

$$\begin{pmatrix} ie^{i\phi}\sqrt{R} & \sqrt{T} \\ \sqrt{T} & ie^{-i\phi}\sqrt{R} \end{pmatrix}\begin{pmatrix} E_1 \\ E_2 \end{pmatrix} \quad \text{[Expression 2]}$$

In Expression 2, of the 2×2 matrix, the process is shown by a determinant where T=R=½ and φ=φs. Accordingly, the electric field of the interference light obtained is shown as follows.

$$\frac{1}{2}\begin{pmatrix} ie^{i\phi_s} & 1 \\ 1 & ie^{-i\phi_s} \end{pmatrix} \quad \text{[Expression 5]}$$

$$\begin{pmatrix} \exp[2\pi i l_1/\lambda] & 0 \\ 0 & \exp[2\pi i l_2/\lambda] \end{pmatrix}\begin{pmatrix} ie^{i\phi_p} & 1 \\ 1 & ie^{-i\phi_p} \end{pmatrix}\begin{pmatrix} E_1 \\ 0 \end{pmatrix}$$

To summarize the above, the electric fields of the first interference light 309 and the second interference light 310 become the first and second components of the above vector, respectively. Therefore, they are expressed as follows.

$$\frac{e^{il_2}}{2}\left(-\exp\left[i\left(2\pi\frac{l_1-l_2}{\lambda}+\phi_p+\phi_s\right)\right]+1\right)E_1 \quad \text{[Expression 6]}$$

$$\frac{ie^{i(-b+2\pi i l_2/\lambda)}}{2}\left(\exp\left[i\left(2\pi\frac{l_1-l_2}{\lambda}+\phi_p+\phi_s\right)\right]+1\right)E_1 \quad \text{[Expression 7]}$$

The intensity of each interference light is equal to the square of the absolute value of the above. Therefore, each value of the intensity is expressed as follows.

$$\frac{1}{2}|E_1|^2\left(1-\cos\left[2\pi\frac{l_1-l_2}{\lambda}+\phi_p+\phi_s\right]\right) \quad \text{[Expression 8]}$$

$$\frac{1}{2}|E_1|^2\left(1+\cos\left[2\pi\frac{l_1-l_2}{\lambda}+\phi_p+\phi_s\right]\right) \quad \text{[Expression 9]}$$

Now, let us consider the following case.

$$\frac{1}{2}|E_1|^2\left(1-\cos\left[2\pi\frac{l_1-l_2}{\lambda}+\phi_p+\phi_s\right]\right) \quad \text{[Expression 8]}$$

For example, in Expression 8, a case where the inside of a cosine is zero corresponds to constructive interference and a case where the inside of cosine is π corresponds to destructive interference, respectively. Therefore, the value of the optical path length difference l1-l2 between the two split beams of light is set to a value corresponding to about one bit of the modulated signal and, further, by setting the inside of the above cosine to zero, it becomes possible to demodulate a signal.

In this regard, a case where the input polarization is s polarization is considered. In this case, when splitting the light to be measured, a generated phase φ in the half beam splitter 302 is expressed as φ=φs. Also, when multiplexing the split light, a generated phase φ is expressed as φ=φp. Now, let us consider the following case.

$$\frac{1}{2}|E_1|^2\left(1-\cos\left[2\pi\frac{l_1-l_2}{\lambda}+\phi_p+\phi_s\right]\right) \quad \text{[Expression 8]}$$

$$\frac{1}{2}|E_1|^2\left(1+\cos\left[2\pi\frac{l_1-l_2}{\lambda}+\phi_p+\phi_s\right]\right) \quad \text{[Expression 9]}$$

In Expressions 8 and 9, φs and φp are replaceable. Therefore, when the light to be measured is of s polarization also, the intensity of the interference light is expressed, like in the case of p polarization, as below.

$$\frac{1}{2}|E_1|^2\left(1-\cos\left[2\pi\frac{l_1-l_2}{\lambda}+\phi_p+\phi_s\right]\right) \quad \text{[Expression 8]}$$

-continued $$\frac{1}{2}|E_1|^2\left(1+\cos\left[2\pi\frac{l_1-l_2}{\lambda}+\phi_p+\phi_s\right]\right)$$ [Expression 9]

Also, general polarization state is shown by superposing p polarization and s polarization. Therefore, even when the light to be measured is in a given polarization state, the intensity of the interference light is expressed as follows.

$$\frac{1}{2}|E_1|^2\left(1-\cos\left[2\pi\frac{l_1-l_2}{\lambda}+\phi_p+\phi_s\right]\right)$$ [Expression 8]

$$\frac{1}{2}|E_1|^2\left(1+\cos\left[2\pi\frac{l_1-l_2}{\lambda}+\phi_p+\phi_s\right]\right)$$ [Expression 9]

That is, since the interference state does not have polarization dependence, there occurs no PDFS.

In this regard, for comparison, a case where the quarter wave plate is not provided is considered. When the input polarization is p polarization, the intensity of the interference light is found as follows.

$$\frac{1}{2}|E_1|^2\left(1+\cos\left[2\pi\frac{l_1-l_2}{\lambda}+\phi_p+\phi_s\right]\right)$$ [Expression 9]

That is, in Expression 9, $\phi_s$ is replaced with $\phi_p$, and the intensity of the interference light will be expressed as below.

$$\frac{1}{2}|E_1|^2\left(1-\cos\left[2\pi\frac{l_1-l_2}{\lambda}+2\phi_p\right]\right)$$ [Expression 10]

$$\frac{1}{2}|E_1|^2\left(1+\cos\left[2\pi\frac{l_1-l_2}{\lambda}+2\phi_p\right]\right)$$ [Expression 11]

Similarly, when the light to be measured is of s polarization, the intensity of the interference light is expressed as follows.

$$\frac{1}{2}|E_1|^2\left(1-\cos\left[2\pi\frac{l_1-l_2}{\lambda}+2\phi_s\right]\right)$$ [Expression 12]

$$\frac{1}{2}|E_1|^2\left(1+\cos\left[2\pi\frac{l_1-l_2}{\lambda}+2\phi_s\right]\right)$$ [Expression 13]

Thus, the phase $\phi$ generated in the half beam splitter 302 varies according to the polarization. That is, when $\phi_p \neq \phi_s$, the interference state of the interference light varies according to the polarization, which causes PDFS.

In the delay interferometer used for the demodulation of DPSK, the delay of the two split beams of light must be set to a value corresponding to one bit of the signal modulation. Therefore, in the case where an optical element such as a quarter wave plate is disposed on the optical path of the split light, an optical system must be designed or adjusted while considering that an extra optical length is produced when the optical element passes. In the present embodiment, however, the quarter wave plates 306 and 308 are of the same thickness. Therefore, the length of the optical path of the split light does not change after the provision of the two plates. Thus, according to the present embodiment, when setting the optical path length of the split light, it is not necessary to consider the thicknesses of the quarter wave plates 306 and 308, which makes it possible to adjust assembly of the optical system easily.

As quarter wave plates 306 and 308 of the present embodiment, zero-order quarter wave plates were used. In general, a zero-order wavelength plate means a wavelength plate in which, with respect to a desired occurring phase difference x (in a case of a quarter wave plate, x=π/2), a phase difference actually occurring between a fast axis and a delay axis is not 2φn+x (where n is an integer except zero) but is strictly x. (On the other hand, a wavelength plate which is not zero order is called a multi-order wavelength plate). As compared to the multi-order quarter wave plate, the zero-order quarter wave plate has a characteristic that the variation of the generated phase difference when the used wavelength change is small. In most cases, methods such as DPSK and DQPSK are used while being combined with wavelength division multiplexing (WDM). Therefore, it is desirable that a demodulator and a delay line interferometer included therein operate in a wideband wavelength (for example, a C band and an L band; 1530 nm-1625 nm). By using the zero-order quarter wave plate, with such a wideband wavelength, a p polarization element and an s polarization element can be reversed effectively.

Figure 4:
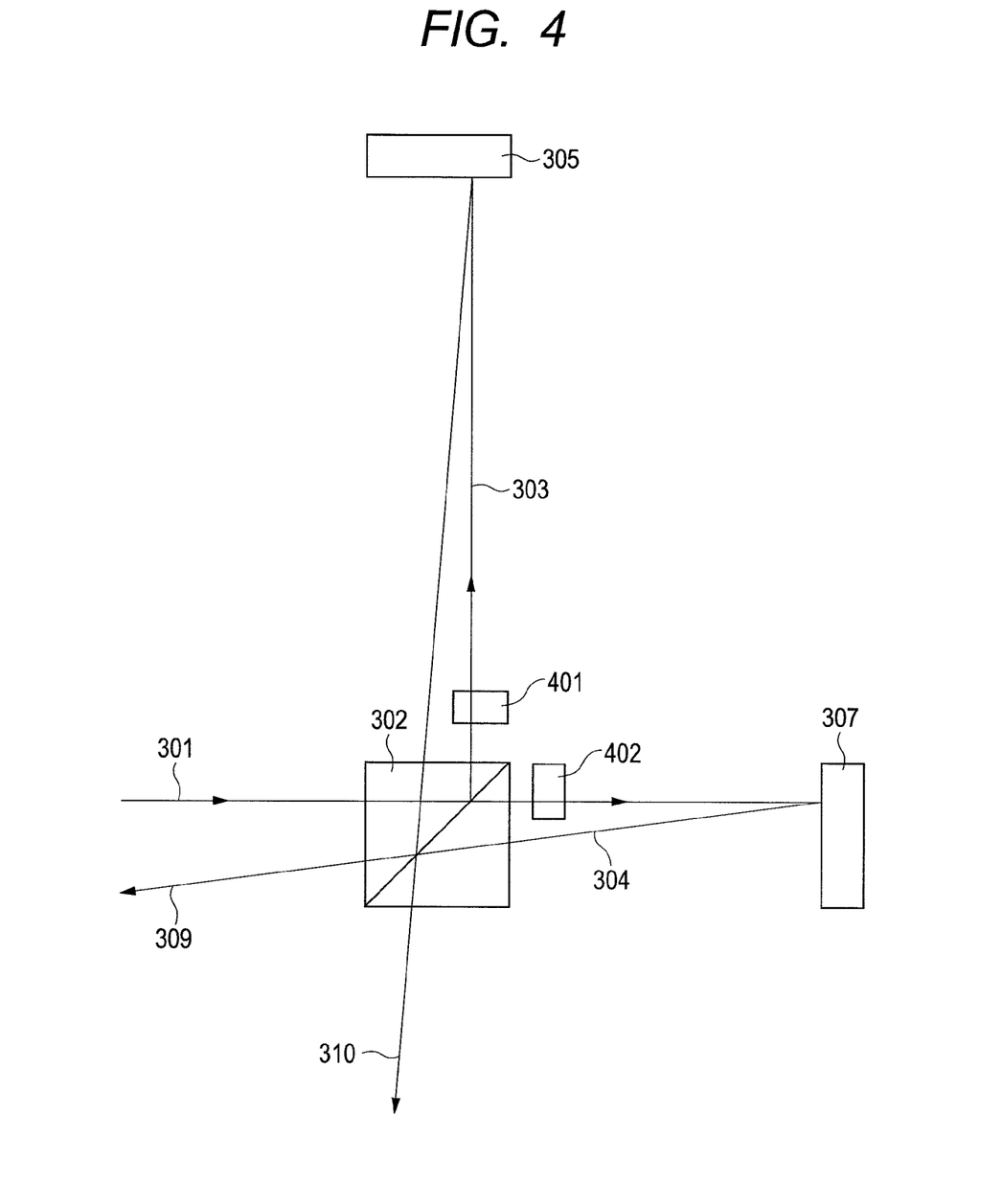
FIG. 4 is a schematic diagram of an interferometer in which p polarization and s polarization are reversed by a half wave plate.

According town embodiment of the present invention, by allowing the light to pass through the quarter wave plates 306 and 307 in a reciprocating manner, the p polarization element and the s polarization element of the split light are reversed. However, the mode of polarization rotation is not limited to this. For example, the similar effect can be obtained, as in FIG. 4, by allowing the light to pass, only once, through half wave plates 401 and 402 whose optical axis direction is inclined by 45 degrees with respect to the p polarization. In FIG. 4, the half wave plates 401 and 402 are disposed on outbound paths of respective split beams of light. However, instead of the above, the half wave plate may be disposed on the inbound path of either of the split beams of light. Moreover, by applying the zero-order half wave plate, the same effect as in the case where the zero-order quarter wave plate is applied can be obtained. Moreover, optical elements such as a Fresnel rhomb other wavelength plates may be used. Even in such a case, the optical element can be used without changing the optical path lengths of the split beams of light by disposing the elements of the same size on the two split optical paths.

Second Embodiment

Figure 5:
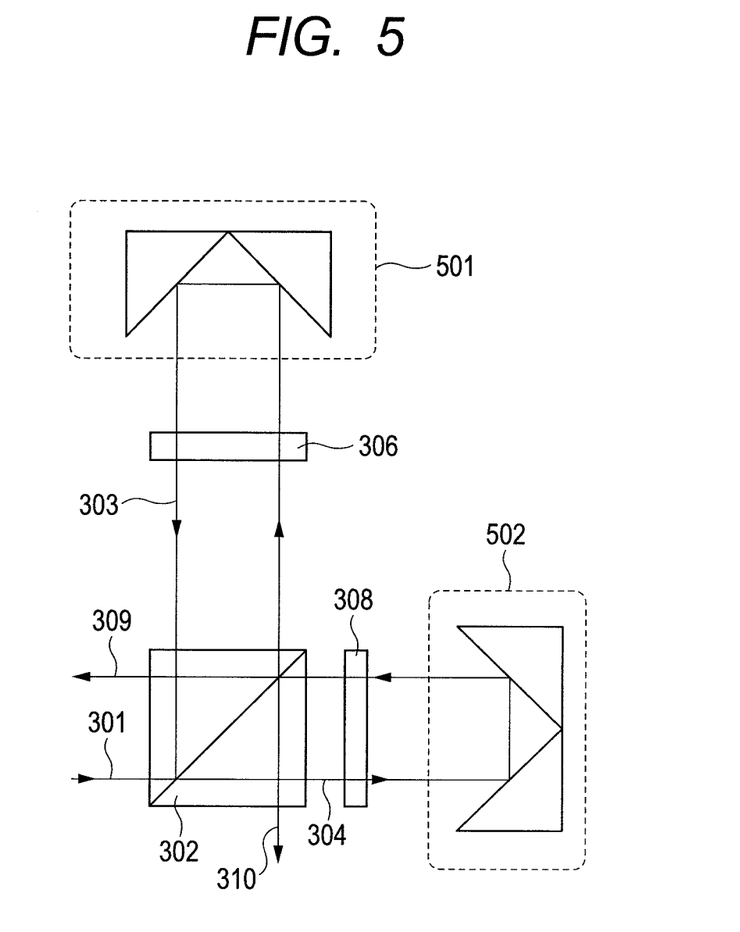
FIG. 5 is a schematic diagram of an interferometer in which optical axis directions of the split beams of light are of antiparallel between the case when the light is split and the case when the light is multiplexed.

As another embodiment, FIG. 5 shows a case where an optical axis direction of the split beams of light when being split and an optical axis direction of the beams of light when being multiplied are of antiparallel to each other. In this case, in place of the mirrors 305 and 307 of the first embodiment, mirror pairs 501 and 502 are implemented, respectively. Then, the position of the split light is shifted, and the split beams of light are emitted precisely in the opposite directions. That is, an optical axis direction of the outgoing light to the mirror pair and an optical axis direction of the return light from the mirror pair are set not to be in parallel with each other. In order that the optical axis direction of the return light from the mirror pairs 501 and 502 is precisely in antiparallel with the direction of the optical axis of the incident light, two mirror surfaces which constitute the mirror pairs are orthogonal to each other. When a phase $\phi$ occurring in the half beam splitter 302 is dependent of an angle of incidence, with the above structure, the light can enter the half beam splitter 302 with the same angle both at the time of being split and at the time of being multiplexed. As a result, the polarization dependence can be eliminated appropriately.

Third Embodiment

Figure 6:
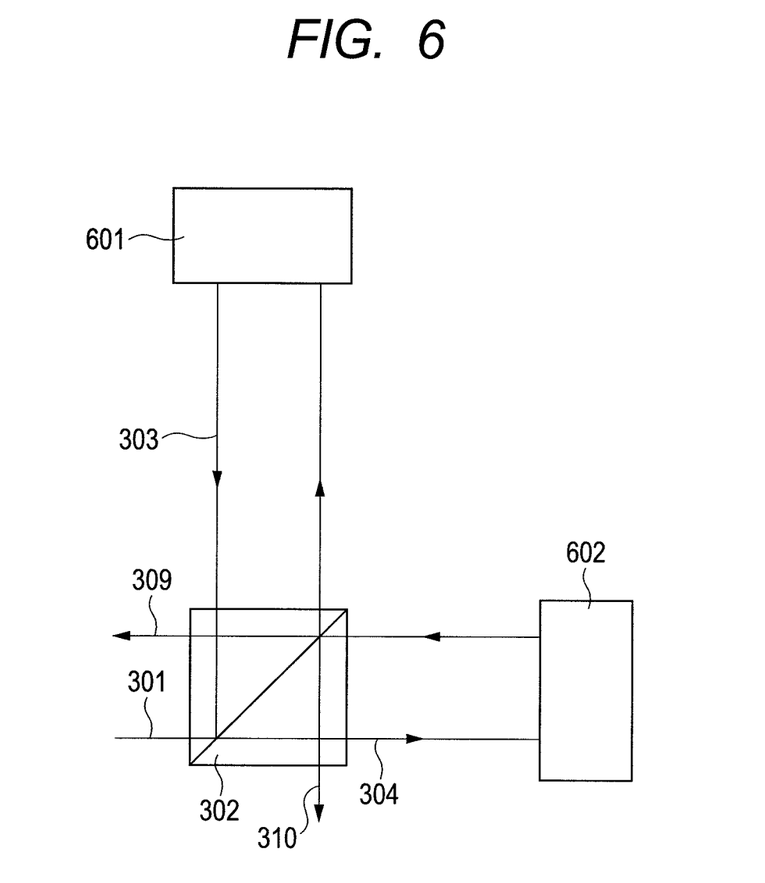
FIG. 6 is a schematic diagram of the interferometer when split light is reflected on a mirror group.
Figure 7:
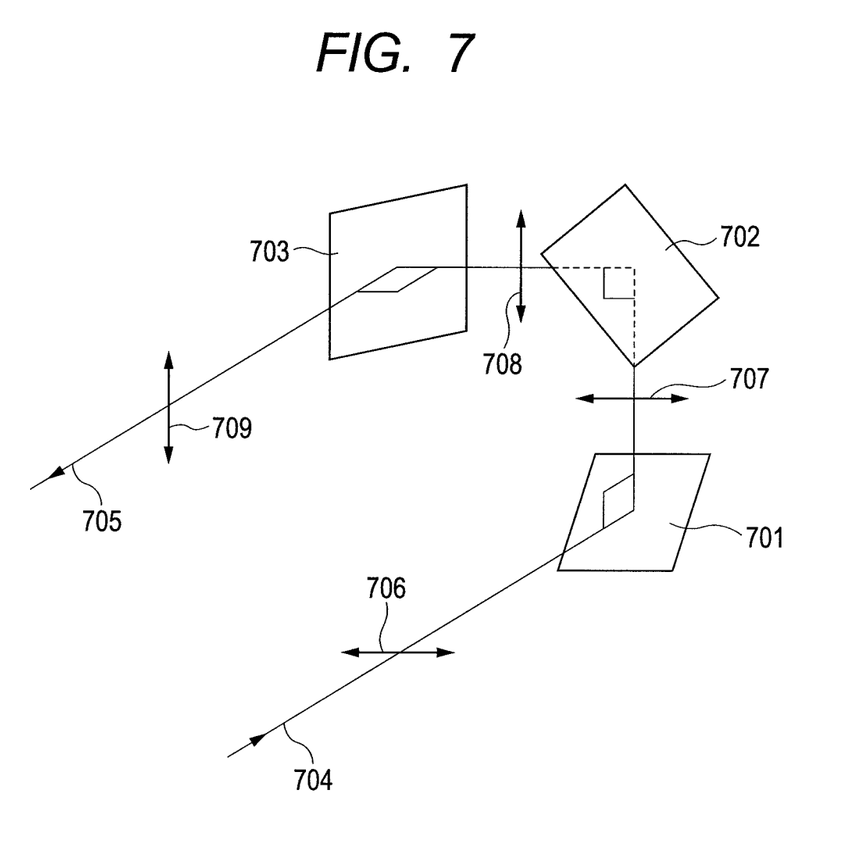
FIG. 7 illustrates details of the mirror group.

As another embodiment, FIG. 6 shows a case where a p polarization element and an s polarization element of the split light are reversed by a group of mirrors 601 and 602. As shown in FIG. 7, the group of mirrors 601 and 602 comprises three mirrors 701, 702, and 703. With the above structure, first, the incident light 704 is reflected vertically. Then, it is reflected horizontally (namely, in a direction orthogonal to the incident light). Finally, it is reflected in the direction opposite to the direction of the incident light and then emitted as return light 705. In this regard, when the incident light is of p polarization (horizontal polarization), as shown in the polarization directions 706, 707, 708, and 709 of FIG. 7, the polarized light rotates geometrically during a process of reflection inside the mirror group. Then, when the polarized light is emitted as return light, it is converted to s polarized light (vertical polarization). Exactly in the same manner, when the incident light is p polarized light, the outgoing light becomes s polarized light. Therefore, with use of the group of mirrors 601 and 602, the reflection of the split light and reversal of the p polarization element and s polarization element can be performed at the same time, which makes it possible to reduce the optical system in size. Moreover, such geometrical rotation of the polarization principally does not depend on a wavelength of light. Therefore, it is possible to effectively reverse the p polarization element and s polarization element at a wideband wavelength, allowing them to be applied to a WDM system. In addition, though not shown in FIG. 6, as seen in FIG. 7, there occur positional shifts in the return light from the mirror group not only in a horizontal direction but also in a vertical direction. However, by designing the height of the half beam splitter 302 to be greater than the positional shift, it is possible, as in the above embodiment, to multiplex the split beams of light 303 and 304 by the half beam splitter 302. Moreover, as an order of reflections in the mirror groups according to the present embodiment, the reflections were carried out in the order of the vertical direction, the horizontal direction, and the opposite direction of the incident light. However, even if the orders of the reflections in the vertical direction and in the horizontal direction are reversed, the similar effect can be obtained. Moreover, whether on the right or on the left in the horizontal direction the light is reflected and whether upward or downward in the vertical direction the light is reflected can be optionally chosen.

Fourth Embodiment

Figure 8:
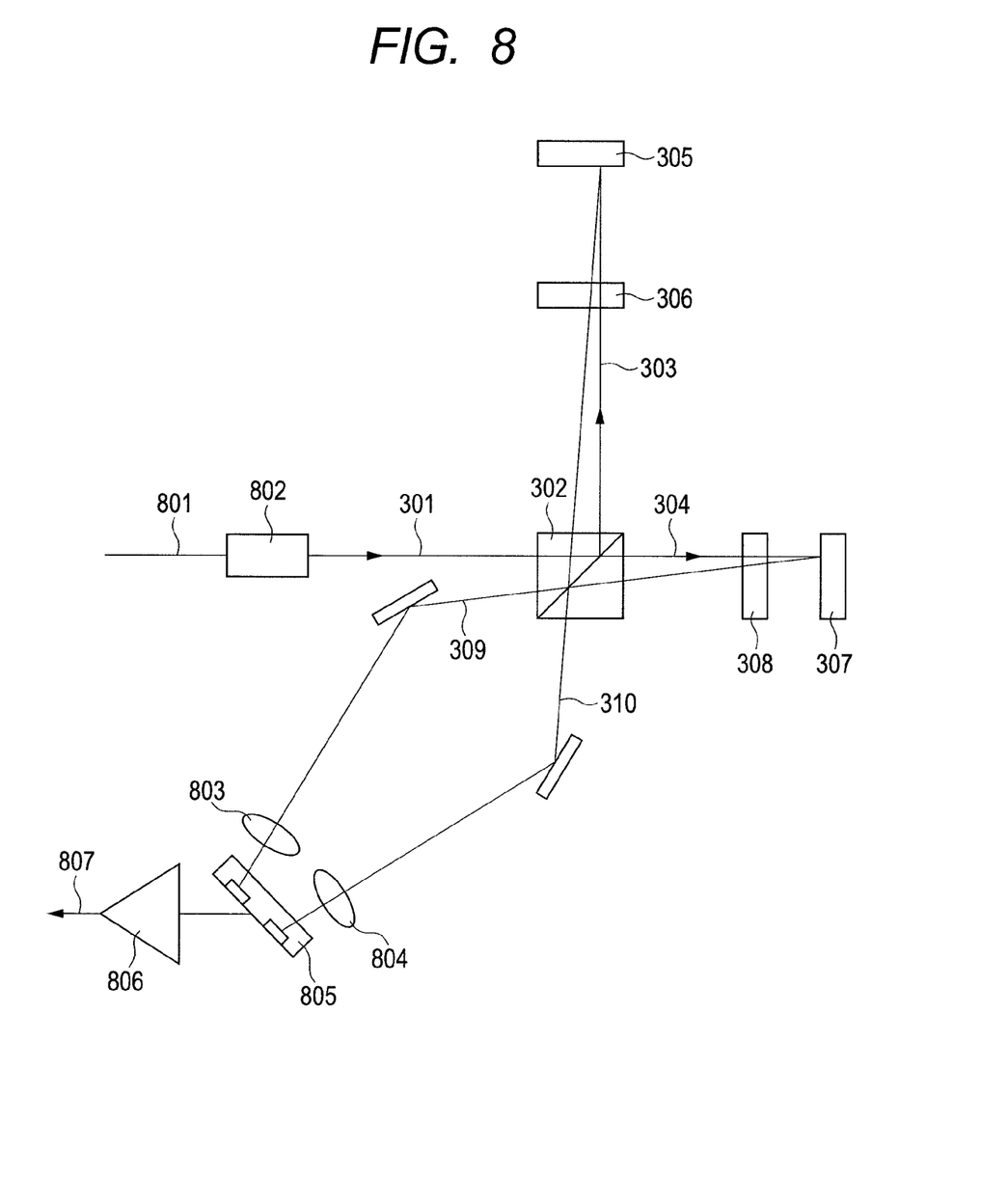
FIG. 8 shows an example of the demodulator for the differential phase shift keying signal of an embodiment of the present invention.

FIG. 8 shows a configuration of a demodulator for differential phase shift keying signals of the present invention. A DPSK-demodulated beam of light sent from an optical fiber 801 is turned into parallel beams by a collimator 802. Then, it enters a half beam splitter 302 and is separated into first split light 303 and second split light 304 at an intensity ratio of 1:1. The first split light 303 enters a mirror 305 at about an angle of 90 degrees. The light reflected on the mirror 305 enters the beam splitter 302 again. In this regard, a quarter wave plate 306 is disposed on the optical path through which the first split light 303 travels in a reciprocating manner. Its fast axis direction is inclined by 45 degrees with respect to p polarization defined by a split surface of the half beam splitter 302. As a result, a p polarization element of the first split light 303 is converted to s polarized light as it enters the half beam splitter 302 again. Similarly, the p polarization element is converted to an s polarization element. In the same manner, the second split light 304 enters a mirror 307 at an angle of about 90 degrees. The light reflected on the mirror 307 enters the beam splitter 302 again. A quarter wave plate 308 (fast axis is inclined by 45 degrees with respect to the p polarization) is disposed on the optical path through which the light travels in a reciprocating manner. Therefore, the p polarization element and the s polarization element are reversed. The first split light 303 and the second split light 304 are multiplexed when they enter the half beam splitter 302 again, and first interference light 309 and second interference light 310 are generated. In this regard, the mirrors 305 and 307 are arranged such that an optical path length difference between the first split light 303 and the second split light 304 corresponds to one bit of the modulated light. For example, when a modulation frequency is 40 Gbps, an optical path length difference is about 7.5 mm. Therefore, depending on whether the amount of phase shift between the adjacent bits of light to be measured is 0 or n, the first interference light 309 and the second interference light 310 become constructive or destructive and, eventually, a phase modulation signal is converted to a light intensity signal. Such interference beams of light are collected by two light receiving units of a balanced optical detector 805, respectively, with collective lens 803 and 804. The balanced optical detector 805 outputs an electric signal corresponding to the intensity difference between these interference beams of light. This output is converted to a voltage signal by the trans-impedance amplifier 805. Thus, a final output power 807 is obtained.

Figure 9:
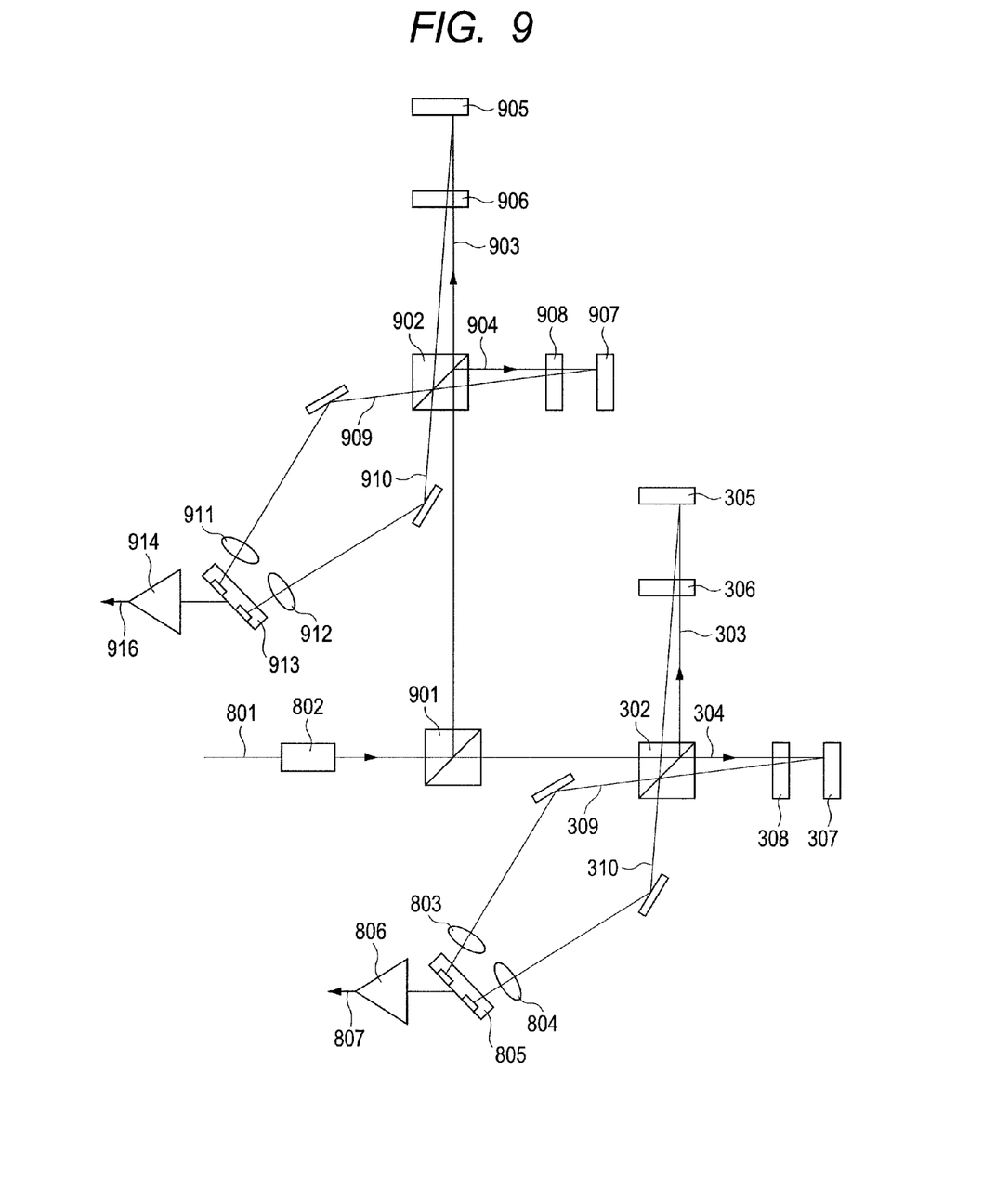
FIG. 9 shows an example of a demodulator for DQPSK of the present invention.

The present embodiment is a demodulator for the differential phase shift keying signals. However, it can easily be applied to a demodulator of DQPSK or a demodulator of general DMPSK. FIG. 9 shows a configuration of the present demodulator. With this structure, measured light which is sent from an optical fiber 801 and whose phase is modulated is turned into parallel beams of light by a collimator 802, and split into two by a half beam splitter 901. Then, the split beams of light are processed as in the demodulator of DPSK, and two output signals 807 and 915 are outputted. Also, the phase difference between the two delay line interferometers is set to 90 degrees.

Fifth Embodiment

Figure 10:
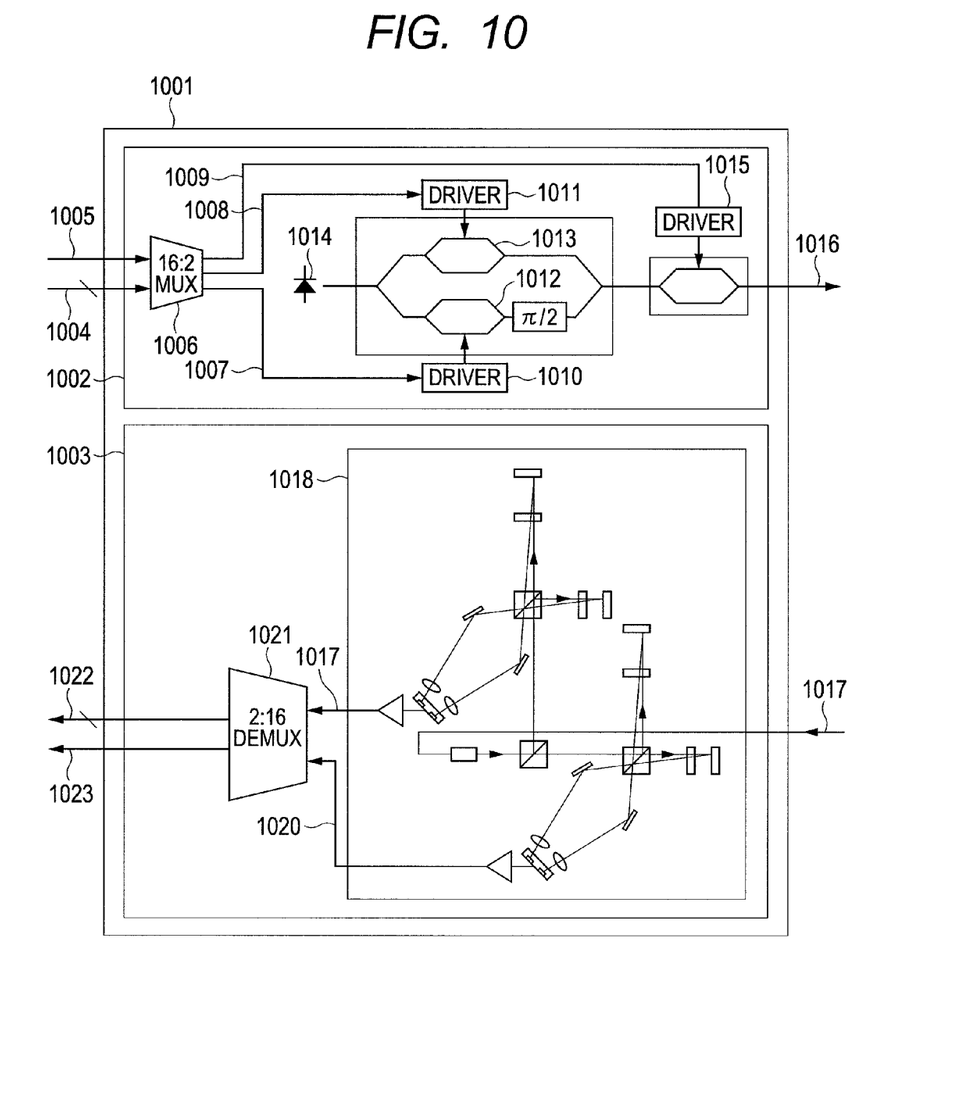
FIG. 10 shows a configuration of a transceiver for the differential phase shift keying signal according to an embodiment of the present invention.

FIG. 10 shows a configuration of a transceiver (optical fiber communications module) for differential phase shift keying signals of the present invention. The present embodiment shows a case of DQPSK. As shown in FIG. 10, the present transceiver 1001 comprises a transmitting unit 1002 and a receiving unit 1003. The transmitting unit 1002 generates plural data signals 1004 and clock signals 1005. Further, the transmission unit 1002 generates, from the multiplexer 1006, a first data modulation signal 1007, a second data modulation signal 1008, and a clock signal 1009. The first and second data modulation signals 1007 and 1008 modulate first and second phase modulators 1012 and 1013 through respective first and second driver software 1010 and 1011, and apply differential phase shift keying on the light emitted from a laser light source 1014. The clock signal 1009 is sent to third driver software 1015, and modulation in the form of a pulse is given to the light on which differential phase shift keying has been applied. The light 1016 thus modulated is transmitted.

Light 1017 on which differential phase shift keying is applied is inputted to the receiver. Then, by a demodulator 1018 similar to the one shown in the fourth embodiment, two output signals 1019 and 1020 corresponding to the same phase component and a direct bound component are generated. These signals are split into plural data signals 1022 and clock signals 1023 in a de-multiplexer 1021 (signal processing unit).

The present embodiment deals with RZ (Return to Zero) optical signals. Therefore, the modulation in the form of pulse was applied by the third driver software 1015. However, the present invention is applicable also to NRZ (Non Return to Zero) optical signals to which the above modulation is not given.

According to an embodiment of the present invention, receiver of a large-capacity optical communication system can be simply and compactly structured, contributing to ever increasing large-capacity communications.

What is claimed is:

1. An interferometer comprising:
   a light splitting component configured to split a light to be measured into a first split light and a second split light;
   a first mirror group configured to reverse a p polarization element and an polarization element of the first split light and to return the first split light back to the light splitting component; and
   a second mirror group, different from the first mirror group, configured to
   reverse a p polarization element
   and an s polarization element of the second split light and to return the second split light back to the light splitting component;
   wherein the first mirror group comprises:
   a first mirror on which the first split light is incident,
   a second mirror which reflects the light reflected on the first mirror, and
   a third mirror which reflects the light reflected on the second mirror to the light splitting component,
   wherein the second mirror group, that is different from the first mirror group, comprises:
   a fourth mirror on which the second split light is incident,
   a fifth mirror which reflects the light reflected on the fourth mirror, and
   a sixth mirror which reflects the light reflected on the fifth mirror to the light splitting component,
   wherein each of the first, second, third, fourth, fifth and sixth mirrors are different from one another, and
   wherein the first split light, which is reflected on the first mirror group, and the second split light, which is reflected on the second mirror group, are multiplexed so as to generate a first interference light and a second interference light.

* * * * *